Figure 1:
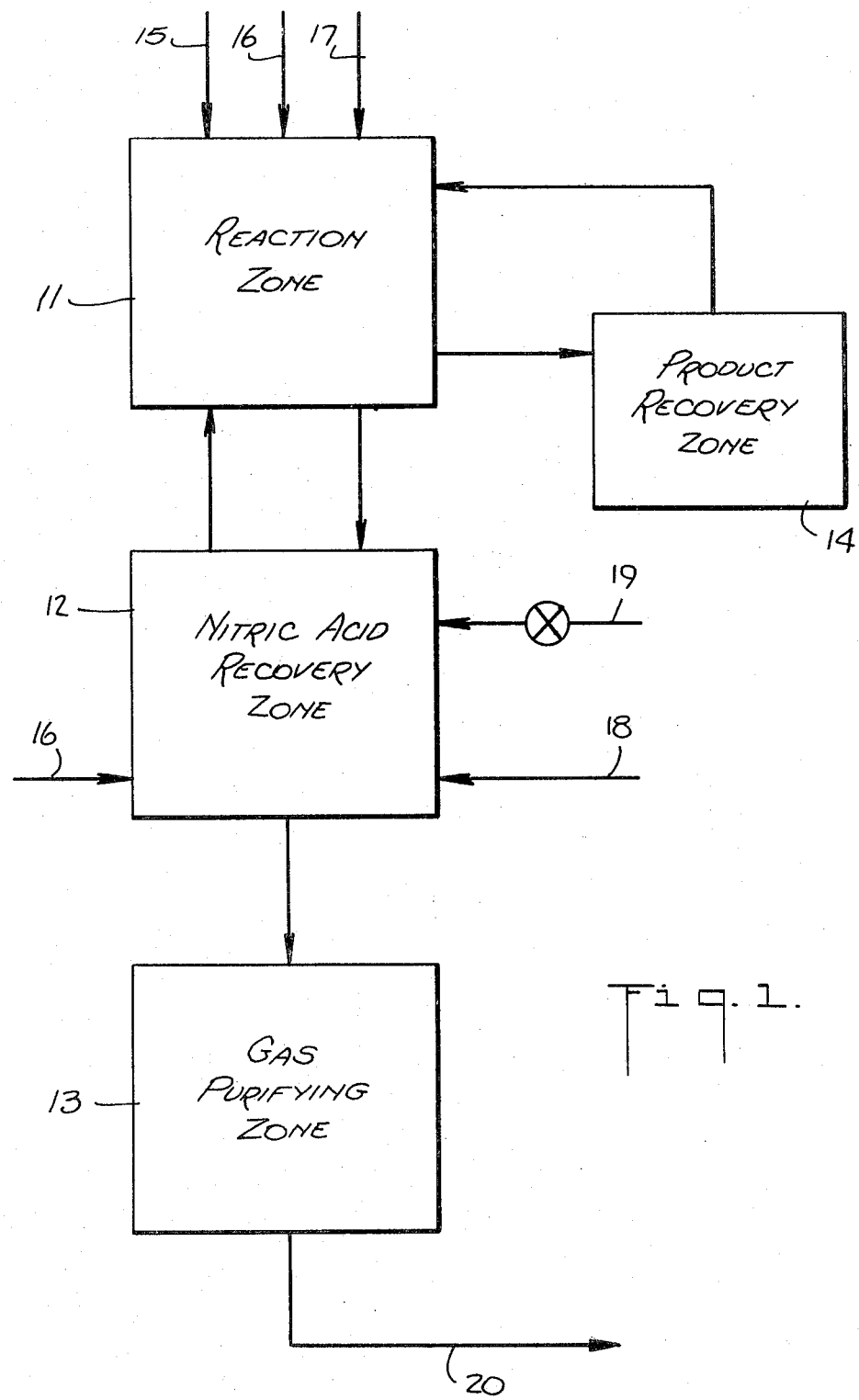

United States Patent [19]

Beutner et al.

[11] 3,857,926

[45] Dec. 31, 1974

[54] PRODUCTION OF NICKEL SULFATE

[75] Inventors: Heinz Paul Beutner, Englewood, Colo.; Charles Edward O'Neill, Port Credit, Ontario, Canada; George Feick, Needham, Mass.

[73] Assignee: The International Nickel Company, Inc., New York, N.Y.

[22] Filed: Mar. 26, 1973

[21] Appl. No.: 345,180

[52] U.S. Cl. .............................. 423/544, 423/393
[51] Int. Cl. ..................... C01g 53/10, C01b 21/40
[58] Field of Search ................... 423/544, 417, 393

[56] References Cited
UNITED STATES PATENTS
3,256,060  6/1966  Glohus ............................ 423/417

OTHER PUBLICATIONS

Jacobson, Encyclopedia of Chemical Reactions, Vol. V, 1953, p. 16 and p. 35.

Mellor, A Comprehensive Treatise on Inorganic and Theoretical Chemistry, Vol. 5, 1924, p. 956.

William E. Trout, Jr., Journal of Chemical Education, December 1937, pp. 575–581.

*Primary Examiner*—Oscar R. Vertiz
*Assistant Examiner*—Hoke S. Miller

[57] ABSTRACT

A process for producing nickel sulfate from nickel carbonyl which comprises reacting nickel tetracarbonyl with nitric acid in the gaseous phase, absorbing the solid product of the reaction in an aqueous solution of sulfuric acid and recovering nickel sulfate from the aqueous solution of sulfuric acid. The process also contemplates an essentially closed system wherein nitric acid, nitrogen oxides and carbon monoxide are recycled. The carbon monoxide is reused to form nickel carbonyl. The nitrogen oxides are reoxidized to nitric acid and the nitric acid is reused to react with additional nickel carbonyl.

9 Claims, 2 Drawing Figures

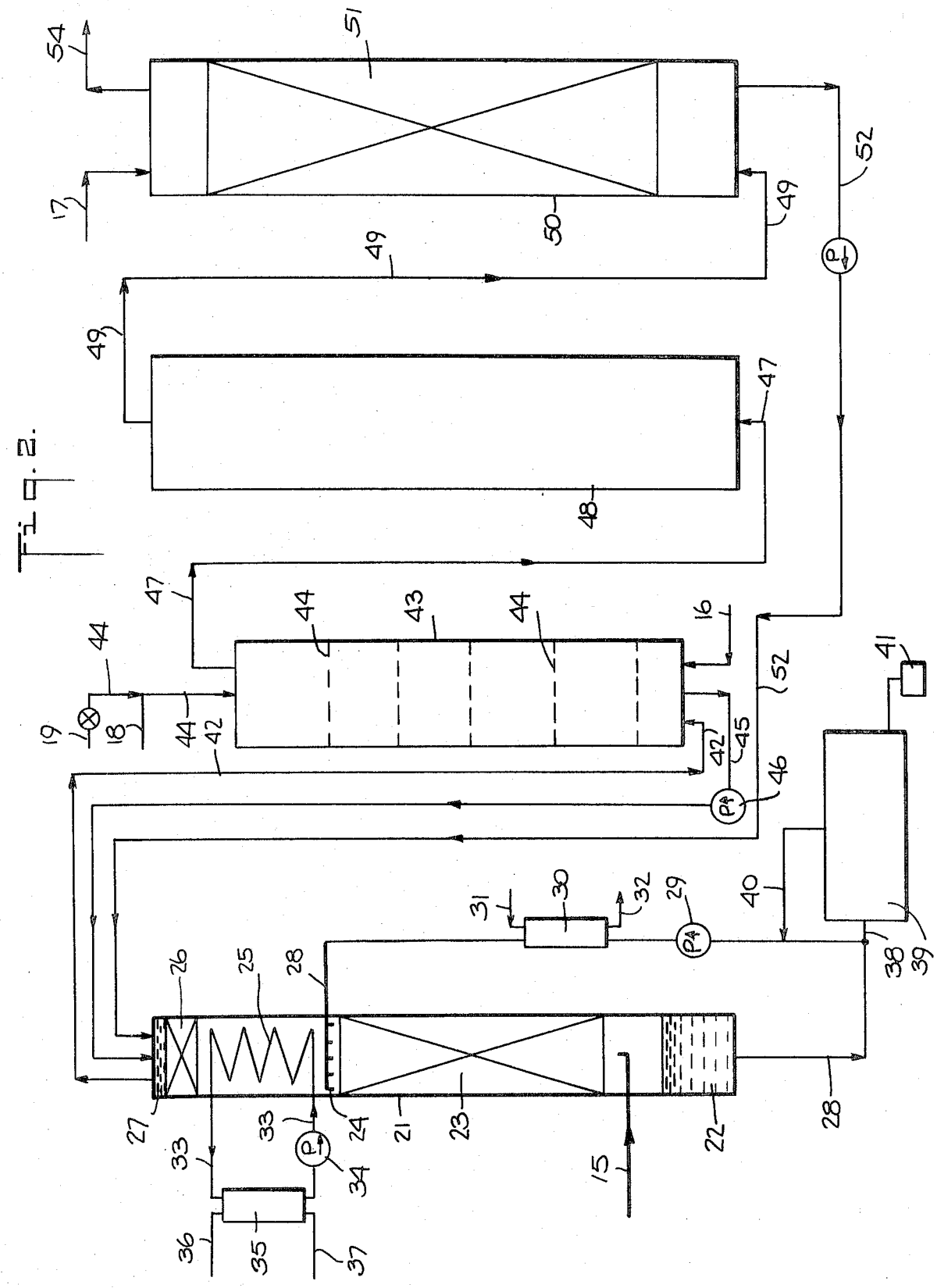

PRODUCTION OF NICKEL SULFATE

The present invention is concerned with the manufacture of nickel sulfate and, more particularly, with the manufacture of nickel sulfate from nickel carbonyl.

It is well known that in processes of extracting nickel from its ores, one commercially important process involves the selective carbonylation of nickel-containing material to form nickel tetracarbonyl (referred to hereinafter as "nickel carbonyl"). It would be highly advantageous, and is genrally the object of the present invention, to convert nickel carbonyl directly into nickel chemicals such as nickel sulfate. The formation of nickel sulfate directly from nickel carbonyl is highly advantageous in that nickel carbonyl can easily be prepared as a very pure material. Consequently, it is expected that nickel sulfate prepared from nickel carbonyl will have a very high degree of purity with respect to other metallics. Obtaining such a high degree of purity in nickel sulfate made by other methods sometimes involves considerable difficulty.

It has now been discovered that by means of a special process nickel sulfate can be prepared nickel carbonyl efficiently and in excellent yield.

It is an object of the present invention to provide a novel process for producing nickel sulfate sulfate from nickel carbonyl.

It is another object of the present invention to provide a novel process of providing nickel sulfate from nickel carbonyl wherein carbon monoxide, nitric acid, and nitrogen oxides employed in or produced in the process are recovered and reused.

Other objects and advantages will become apparent from the following description taken in conjunction with the drawing in which:

FIG. 1 shows a schematic outline of the novel process of the present invention; and FIG. 2 is a flow diagram of an advantageous aspect of the process of the present invention.

Generally speaking, the present invention contemplates a process of converting nickel carbonyl which comprises reacting the nickel carbonyl with nitric acid in the gaseous phase, absorbing the solid product of said reaction in an aqueous solution of sulfuric acid and recovering nickel sulfate from the aqueous solution of sulfuric acid.

The process of the present invention is represented for purposes of material balance by the equation

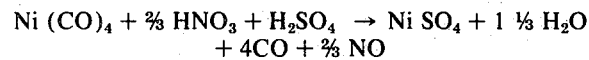

$$Ni(CO)_4 + \tfrac{2}{3} HNO_3 + H_2SO_4 \rightarrow NiSO_4 + 1\tfrac{1}{3} H_2O + 4CO + \tfrac{2}{3} NO$$

Assuming that nitrogen oxides are reoxidized and reused the following material balance equation is applicable.

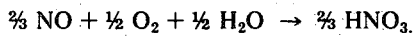

$$\tfrac{2}{3} NO + \tfrac{1}{2} O_2 + \tfrac{1}{2} H_2O \rightarrow \tfrac{2}{3} HNO_3.$$

Overall then, assuming that the nickel sulfate is recovered as the hexahydrate, the material balance, assuming no losses, is represented by the equation $Ni(CO)_4 + \tfrac{1}{2} O_2 + H_2SO_4 + 5 H_2O \rightarrow NiSO_4 \cdot 6 H_2O + 4CO$.

Those skilled in the art will appreciate that the foregoing equations set forth the material balance only and do not necessarily represent the mechanism of the process of the present invention. Contrary to the impression one might get from the first of the foregoing equations, reaction occurs between nickel carbonyl and nitric acid mainly in the gas phase, advantageously in a gas liquid contacting column consisting of a packed tower, which is irrigated with an aqueous liquor containing in solution sulfuric acid and advantageously maintained at a temperature of about 70° or 80° C. up to about the boiling point under the ambient pressure in the system of the aqueous liquor. Sulfuric acid enters into the reaction when the solid product of the gas phase reaction is absorbed by the irrigating liquor. After the reaction is complete, nickel sulfate is crystallized out of the liquor usually in the form of the hexahydrate.

While it is possible to carry out the process of the present invention without providing any means for recovery of materials used in the process, it is highly advantageous to provide means to recover and purify carbon monoxide, to recover nitric acid, oxidize nitrogen oxides in the presence of water so as to reform nitric acid and to minimize losses of any kind.

A schematic outline of such a system is depicted in FIG. 1 of the drawing.

Referring now thereto, FIG. 1 depicts a system having four functional sections, reaction zone 11, nitric acid recover zone 12, gas purifying zone 13, and product recovery zone 14. In reaction zone 11, nickel carbonyl gas reacts with gaseous nitric acid and is absorbed in a circulating liquor containing sulfuric acid. The circulating liquor is maintained advantageously at about 100° C. Gas exiting from reaction zone 11 and entering nitric acid recovery zone 12 contains nitrogen oxides and carbon monoxide. This gas is mixed with oxygen and contacted by process makeup water in nitric acid recovery zone 12 to produce a dilute nitric acid solution which is returned to the circulating liquor supply. Gas purification zone 13 comprises a gas holdup zone which permits the oxidation of a substantial proportion of the remaining nitric oxide to nitrogen dioxide. The thus produced nitrogen dioxide is then scrubbed by sulfuric acid to dry the gas and to absorb a substantial portion of the nitrogen oxides present to produce nitrosyl sulfuric acid. The gas exiting from the sulfuric acid scrubbing means, contains small amounts of nitrogen oxides and oxygen with the balance being essentially carbon monoxide. The gas can be further purified in conventional ways to remove the nitrogen oxides and the oxygen so as to produce essentially pure carbon monoxide. Means for removing nitrogen oxides include a secondary scrubbing by sulfuric acid, a catalytic oxidation of nitric oxide on active charcoal or the like. Oxygen can be removed by absorption on copper or conversion to carbon dioxide over a palladium catalyst. Product recovery zone 14 comprises means for cooling a part of the circulating liquor to crystallization temperature, means for crystallizing nickel sulfate means for recovering the crystals from the mother liquor and means for returning the mother liquor to reaction zone 11.

Speaking more particularly with respect to the reaction zone 11, as maintained in a continuously oprating system, it is necessary to provide a suitable circulating liquor composition which has certain criteria. The circulating liquor must contain sulfuric acid. It must give at the reaction temperature, e.g., 100° C., a sufficiently high vapor pressure of nitric acid to provide nitric acid in the vapor phase in amounts adequate to react completely with in-coming nickel carbonyl. It must be capable of dissolving nickel sulfate; it must contain water and it must be capable of releasing crystals of nickel sulfate hexahydrate upon cooling, for example, down to 25° C. or below. A circulating liquor composition which has been found to be effective for the foregoing purposes contains, in percent by weight, about 30% sulfuric acid, about 5% nitric acid, about 10.6% nickel sulfate, calculated as the anhydrous salt, with the balance being water. Those skilled in the art will appreciate that at the initiation of the process, the circulating liquor will not necessarily contain any significant amount of nickel. As the process proceeds, nickel sulfate will accumulate in the circulating liquor and when it exceeds approximately 10%, measured as the anhydrous salt, crystallization of the hexahydrate can occur at temperatures of about 5° C. At about 10.6% anhydrous nickel sulfate, crystallization of the hexahydrate can occur at temperatures as high as 25° C. When the nickel sulfate accumulates to the amount of about 13.8%, measured as the anhydrous salt, crystallization will occur at 92° C. Accordingly, in order to effectively operate the process of the present invention on a continuous basis, it is advantageous to maintain the concentration of anhydrous nickel sulfate in the circulating liquor at abuot 10% to about 13% by weight. This permits continuous crystallization of part of the circulating liquor in a crystallizer at temperatures of about 25° C. without the danger of crystals forming in the system at locations where the temperature is higher. For practical control purposes, one should advantageously maintain the concentration of nickel sulfate, measured as the anhydrous salt, in the liquor at about 10.5% to 11.5% by weight.

While it is possible to use larger or smaller amounts of sulfuric acid and nitric acid in the circulating liquor, it is highly advantageous to employ about 30% by weight sulfuric acid and about 5% by weight of nitric acid. The selection of these concentrations represents a compromise between the desirability of a high acid concentration to increase the reactivity of the nitric acid with nickel carbonyl and the need for resonably high solubility of nickel sulfate in the liquor at temperatures around 100° C. and a lesser solubility at lower temperature to allow product recovery by crystallization. It is to be observed, however, that the process of the present invention is operable employing amounts of sulfuric acid of about 20% to about 60% by weight and amounts of nitric acid of about 1% to about 40% by weight in the circulating liquor. Those skilled in the art will appreciate that the remainder of the circulating liquor other than dissolved nickel sulfate is essentially water.

When employing the advantageous circulating liquor in accordance with the concepts of the present invention as discussed hereinbefore, which provides a partial pressure of about one-half atmosphere of water at 100° C. along with nitric acid vapor, a residence time of about 10 seconds of nickel carbonyl in the reaction zone is all that is necessary to achieve reaction. Because it is important for reasons of both safety and economics that all nickel carbonyl entering reaction zone 11 react with nitric acid it is necessary to maintain the rate of circulation of irrigating liquor so that a stoichiometrical excess of nitric acid is present in the gas phase. Ordinarily this will be satisfied when operating at 100° C. by introducing at least about 10 and up to about 200 or more mole weights of nitric acid in the irrigating liquor into the reaction zone for each mole weight of nickel carbonyl introduced into the reaction zone. The foregoing teaching concerning the required amount of circulating liquor presumes, of course, the use of rings, saddles or the like in the reaction zone to provide large surface areas for liquid-gas interaction and thus the maintenance of a relatively high steady state concentration of nitric acid in the reaction zone atmosphere. The oxygen consumed in the overall reaction and used specifically to reoxidize oxides of nitrogen produced by reaction of nickel carbonyl and nitric acid can be introduced along with nickel carbonyl and nitric acid into the gas space of reaction zone 11 or, alternatively or in addition, can be introduced into the gas stream exiting from reaction zone 11. Unlike prior art endeavors which in the past have produced explosions with mixtures of nickel carbonyl and oxygen, the reactions involved in the process of the present invention proceed rapidly but smoothly at about 100° C. even in the presence of oxygen in amounts as contemplated in the overall material balance equation set forth hereinbefore. It is believed that oxygen takes little or no part in the reactions proceeding in reaction zone 11 because apparently equivalent reactions take place both in the presence and absence of oxygen. However, to the extent oxygen may contribute to the reactions occurring in reaction zone 11, such contribution is contemplated to be within the purview and ambit of the claims of the present application.

The process of the present invention has been conceived and reduced to practice as a process operating under essentially normal atmospheric pressure. Nickel carbonyl has been introduced into reaction zone 11 in the form of vapor at about 0.5 atmosphere partial pressure in carbon monoxide carrier gas; the two gases having a total pressure only sufficiently slightly above atmospheric pressure so as to insure entry into reactin zone 11. Obviously, pressures both higher and lower than atmospheric can be used if desired. Pressures lower than atmospheric may result in inefficient use of space in the total system. Speaking solely of reaction zone 11, it is to be noted that because the volume of exiting gases is substantially greater than the volume of gases entering into the reactions in reactor zone 11, little advantage is to be gained from superatmospheric pressure operation. On the other hand, as a counterbalancing feature the oxidation of nitrogen oxides in the presence of water to form nitric acid is clearly enhanced by high pressure. Accordingly, although complications may be involved, it is within the contemplation of the present invention to provide a process wherein the reactions taking place in reaction zone 11 are conducted at or around one atmosphere of a pressure and the reactions involved in oxidation of nitrogen oxides in nitric acid recovery zone 12 are conducted at higher pressures, for example, up to about 10 atmospheres or higher. Gas purification occurring in gas purifying zone 13 can also be carried out at superatmospheric pressure if desired.

In addition to means 15, 16, 17 and 18 for introducing reacting amounts of nickel carbonyl, oxygen sulfuric acid and water, respectively, into the system depicted in FIG. 1 of the drawing, means 19 is provided for introducing makeup amounts of nitric acid into the system and means 20 is provided to exhaust carbon monoxide from the system. While nitric acid functions as a reformable oxidizing agent and thus is catalytic in nature in the process of the present invention, inevitable losses of nitric acid occur chiefly because it is uneconomic to reoxidize all nitrogen oxides produced by reaction of nitric acid with nickel carbonyl. Small amounts of nitrogen oxides are removed in gas purification zone 13 without reoxidation and recovery. Accordingly, makeup amounts nitric acid equivalent to the losses of nitrogen oxides should be introduced into the system depicted in FIG. 1. Also depicted in FIG. 1, oxygen admitted to the system by means 16 can be admitted to reaction zone 11 or to nitric acid recovery zone 12 or at both locations.

In order to give those skilled in the art a better understanding and appreciation of the invention, the following Examples are given:

EXAMPLE I

A reaction vessel having a vertically standing gas-liquid contact unit containing Rachig rings and having a volume of 500 units was set up for counter-current liquid-gas flow at a temperature of 100° C. and atmospheric pressure. An irrigating liquid initially containing 45% by weight sulfuric acid, 5% by weight of nitric acid with the balance water and heated to 100° C. was caused to flow rapidly downward through the contact unit. Simultaneously, a gas mixture containing 25 parts by volume of carbon monoxide, 25 parts by volume of nickel tetracarbonyl and 50 parts by volume of oxygen was introduced at a rate of 66 parts by volume per minute into the bottom of said gas-liquid contact units and caused to flow toward a top exit. Essentially all of the nickel carbonyl reacted in the gas-liquid contact unit so as to produce an exit gas enriched in carbon monoxide and containing nitrogen oxides. Nickel sulfate hexahydrate was crystallizable from the irrigating liquid.

EXAMPLE II

In a reaction vessel similar to that used in Example I but having a gas-liquid contact unit of 400 unit volume maintained at about 100° C., an irrigating liquid containing 25% by weight of sulfuric acid, 25% by weight of nitric acid, 8.6% by weight of nickel sulfate (based on anhydrous salt) with the balance water was rapidly flowed counter-current to a gas containing equal parts by volume of nickel carbonyl and carbon monoxide flowing at a rate of 40 volume units per minute. Reaction over a period of 120 minutes at atmospheric pressure resulted in 100% reaction in the gas-liquid contact unit and recoverable nickel sulfate hexahydrate in the irrigating liquid.

EXAMPLE III

Similar results were obtained to those set forth in Example II employing the same apparatus, the same gas mixture, the same gas and liquid flow rates and the same temperature; the only difference being that the irrigating liquid contained (in percent by weight) about 45% sulfuric acid, about 5% nitric acid, about 8.6% nickel sulfate, (based on anhydrous salt) with the balance being essentially water.

In contrast to the foregoing Examples, a test run in the same type of apparatus at the same temperature and pressure using 50% by weight sulfuric acid in water as the irrigating liquid and a gas mxiture of 40 volume percent carbon monoxide, 40 volume percent nickel carbonyl and 20 volume percent oxygen resulted in an explosive reaction either in the exhaust gas or in the reactor.

EXAMPLE IV

Addition of 4.2% by weight of nitric acid to the 50% by weight sulfuric-acid-in-water irrigating liquid mentioned in the preceding paragraph in place of an equal percent by weight of water and changing nothing else resulted in a smooth reaction in the gas-liquid contact unit and build up of nickel sulfate in the irrigating liquid.

EXAMPLE V

An apparatus was set up comprising a heated reservoir maintained at about 100° C., a gas-liquid raschig-ring-packed gas-liquid contacting column surmounting and connected to the reservoir, a pump and line adapted to draw liquor from the reservoir and inject it at the top of the gas-liquid contacting column, a reflex condensor connected to the top of the gas-liquid contacting column, a gas purifying train connected to the outlet of the reflex condensor and venting to the atmosphere, oxygen feed means to the bottom of the gas-liquid contacting column and on to the stream of gas exiting at the top of the gas-liquid contacting column a carbon monoxide feed means to the bottom of the gas-liquid contacting column and a nickel carbonyl vaporizing and feeding means as a controllable shunt on the carbon monoxide feed means. The apparatus also included means for sampling and monitoring the irrigating liquor and recovering crystalline product therefrom. A number of runs were made using the aforedescribed apparatus with a gas feed calculated to give a 10 second nickel carbonyl residence time in the gas-liquid contacting column. Simultaneously, during the runs, the gas-liquid contacting column was irrigated with a liquor containing 37.2% by weight sulfuric acid, 9.5% by weight $HNO_3$ and about 10% by weight of nickel sulfate (calculated as the anhydrous salt) with the balance being water at a rate such that a volume of liquor approximately 1.5 times the volume of the gas-liquid contacting column was passed therethrough every minute. Using a 50 volume percent feed of nickel carbonyl in carbon monoxide and no oxygen addition, it was found that about 6.1 moles of exit gas are produced for each mole of nickel carbonyl reacted, the exit gases analyzing at about 5.4 moles of carbon monoxide to about 0.66 mole of nitric oxide. No nickel carbonyl was detected in the exit gases indicating complete reaction in a 10 second residence time in the gas-liquid contacting column. In runs where oxygen was added either at the base of the gas-liquid contacting column or at the exit thereof, very little nitric oxide was found in the exit gases, the bulk thereof being oxidized to nitrogen dioxide or other higher oxides. This shows that presence of oxygen in the nickel carbonyl reaction zone is unnecessary for oxidation of nitric oxide. In the runs, nickel-containing product was recovered both from the liquor and mist carried over from the gas-liquid reacting column. The product crystallized from the liquor was nickel sulfate hexahydrate. The product carried over as mist from the top of the gas-liquid contacting column was free of sulfate indicating that sulfuric acid does not significantly enter into the reactions inherent in the process of the present invention until the product of the reaction of nitric acid and nickel carbonyl is absorbed in the circulating liquor.

EXAMPLE VI

A commerical size installation suitable for operating the process of the present invention on a commercial scale is depicted in schematic outline in FIG. 2 of the drawing. Referring now thereto, columnar reactor 21 comprises from bottom to top well 22 containing, during operation, hot (100° C.) irrigating liquor having a steady state composition of about 30% by weight sulfuric acid, about 5% by weight nitric acid, about 10.6% by weight nickel sulfate (based on anhydrous salt) with the balance being water; means 15 for introducing nickel carbonyl plus carrier gas, e.g., carbon monoxide, into columnar reactor 21; liquid gas contacting volume 23 packed with raschig rings, saddles or the like; spray means 24; condensor 25; liquid-gas contact volume 26 and mist eliminator 27. Irrigating liquid in well 22 is caused to flow through line 28 by circulating pump 29 through heat exchanger 30 (fed with steam through line 31 and exhausted by condensate line 32) into columnar reactor 21 at a point above packed volume 23 and below condensor 25. Spray means 24 allows efficient wetting of the packing in volume 23 by irrigating liquid flowing through line 28. Condensor 25 is supplied internally with cooling fluid by means of line 33, circulating pump 34 and heat exchanger 35 supplied with cold water by means of lines 36 and 37. On a continuous basis part of the irrigating liquid flowing in line 28 is diverted through line 38 into crystallizer 39, the irrigating liquid depleted in nickel sulfate being returned to line 28 through line 40. Nickel sulfate hexahydrate is removed from crystallizer 39 through product take-off 41.

During operation of columnar reactor 21, gases rich in carbon monoxide and containing nitrogen oxides (e.g., nitric oxide), water vapor and nitric acid vapor, exit from columnar reactor 21 by means of line 42 and are caused to enter nitric acid column 43 at the bottom thereof. Oxygen in amounts adequate to react with nitrogen oxides present on the basis of the material balance equations set forth hereinbefore is also caused to enter nitric acid column 43 at the bottom thereof through means 16. Nitric acid column 43 comprises an enclosure containing a series of bubble cap plates 44 which are fed from the top by water entering through means 18 and line 44. Nitric acid diluted with water exits from the bottom of nitric acid tower 43 through line 45 and is forced by pump 46 through line 45 to and into the top of columnar reactor 21. Makeup amounts of nitric acid to compensate for losses of nitrogen oxides are caused to enter the top of nitric acid column 43 through means 19 shown to be cut off by valve 46 to indicate that makeup amounts of nitric acid can be added intermittently.

Gases exiting from nitric acid tower 43 are rich in carbon monoxide and contain small amounts of unreacted oxygen, nitric oxide and water vapor. These gases pass through line 47 into nitric oxide oxidation column 48 containing free space adequate to provide a gas residence time sufficient to allow significant additional oxidation of nitric oxide. Gases exiting from nitric oxide oxidation column consisting chiefly of carbon monoxide, water vapor, oxygen, and small, essentially equimolar amounts of nitric oxide and nitrogen dioxide. These gases pass through line 49 into the bottom of nitrogen oxides absorber 50. Nitrogen oxides absorber 50 comprises a ring-or saddle-packed volume 51 over which packing passes gases entering through line 49 and concentrated sulfuric acid entering through means 17. The sulfuric acid absorbs essentially all the water vapor in the gases and a large amount of the nitrogen oxides to form nitrosyl sulfuric acid. The diluted acid mixture passes out of nitrogen oxides absorber 50 by means of line 52 and is pumped by means of pump 53 to and into the top of columnar reactor 21. Tail gas exiting from nitrogen oxides absorber 50 through line 54 is essentially dry and contains greater than 98% by volume carbon monoxide Residual impurities can be removed by absorbing or catalytic means prior to reuse of the carbon monoxide in the manufacture of nickel carbonyl or for other purposes.

Those skilled in the art will appreciate that the apparatus depicted in FIG. 2 of the drawing and referred to in Example VI can be modified somewhat and still achieve the advantages of the present invention. Thus, the apparatus used in carrying out the process of the present invention comprises essentially means for reacting nickel carbonyl with nitric acid in the gaseous phase, means for absorbing the nickel-containing reaction product in a sulfuric acid-containing medium and means for recovering nickel sulfate from said medium. In addition to this core apparatus, means can be provided for oxidizing nitrogen oxide products of the nickel carbonyl-nitric acid reaction, for recycling the reoxidized nitrogen oxides as nitric acid in the reaction as well as for purifying carbon monoxide used as a carrier and produced in the reaction. All means capable of performing these functions are to be considered to be within the ambit and scope of the present invention. For example, while the invention has been described in terms of product recovery by crystallization of nickel sulfate hexahydrate, other means of recovery are contemplated. For example, with an irrigating liquor in which nickel sulfate has low solubility it is possible to recover product therefrom by continuous filtation means.

As a further point in the description in Example VI, materials of construction have not been specified because, as those skilled in the art will appreciate, a wide variety of acid resisting materials are readily available for each usage. Among such materials are chemical stoneware, porcelain, glass-lined steel equipment and lines, steel coated with polytetrafluoroethylene, stainless steel and the like.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A process for producing nickel sulfate comprising reacting nickel carbonyl with nitric acid in the gas phase, absorbing the nickel-containing product of said reaction in an aqueous solution of sulfuric acid and recovering nickel sulfate from said aqueous solution.

2. The process as in claim 1 wherein the reaction between nickel carbonyl and nitric acid is carried out at a temperature of at least about 70° C.

3. The process as in claim 1 wherein the reaction between nickel carbonyl and nitric acid is carried out in a gas phase in contact with hot aqueous solution containing nitric acid in addition to sulfuric acid.

4. The process as in claim 3 wherein the aqueous solution is maintained at about about 100° C. and contains, in percent by weight, about 20% to about 60% of sulfuric acid and about 1% to about 40% nitric acid.

5. The process as in claim 4 wherein the aqueous solution is containuously circulated through a liquid-phase gas-phase contact zone at about 100°C. and contains as a steady state composition in percent by weight about 30% sulfuric acid, about 5% nitric acid, about 10% to about 13% nickel sulfate (measured as the anhydrous salt) with the balance being essentially water.

6. The process as in claim 1 wherein nitrogen oxides resulting from the reaction of nitric acid and nickel carbonyl are reacted with oxygen in the presence of water to form nitric acid for reaction with additional nickel carbonyl.

7. The process as in claim 1 wherein nickel sulfate is recovered from said aqueous solution of sulfuric acid by crystallization as nickel sulfate hexahydrate.

8. The process as in claim 1 operated continuously wherein makeup amounts of sulfuric acid are added in the form of concentrated acid brought into contact with gaseous products of the reaction of nickel carbonyl and nitric acid to dry said gaseous products and absorb significant quantities of nitrogen oxides therefrom.

9. The process as in claim 1 wherein the carbon monoxide fraction of the gaseous products of the reaction of nickel carbonyl and nitric acid is purified and caused to react with nickel to provide additional nickel carbonyl.

* * * * *